(12) United States Patent
Gentile

(10) Patent No.: US 10,409,462 B2
(45) Date of Patent: *Sep. 10, 2019

(54) COMPUTERIZED SYSTEM FOR CREATING INTERACTIVE ELECTRONIC BOOKS

(71) Applicant: Jujo, Inc., Boulder, CO (US)

(72) Inventor: Antonio Gentile, Palermo (IT)

(73) Assignee: JUJO, INC., A DELAWARE CORPORATION

( * ) Notice: Subject to any disclaimer, the term of this patent is extended or adjusted under 35 U.S.C. 154(b) by 167 days.

This patent is subject to a terminal disclaimer.

(21) Appl. No.: 15/444,595

(22) Filed: Feb. 28, 2017

(65) Prior Publication Data

US 2017/0168671 A1 Jun. 15, 2017

Related U.S. Application Data

(63) Continuation of application No. 14/194,707, filed on Mar. 1, 2014, now Pat. No. 9,619,250.

(60) Provisional application No. 61/861,912, filed on Aug. 2, 2013.

(51) Int. Cl.
| | |
|---|---|
| *G06F 17/00* | (2019.01) |
| *G06F 3/0483* | (2013.01) |
| *G06F 3/0484* | (2013.01) |
| *G06F 9/451* | (2018.01) |
| *G06F 16/27* | (2019.01) |
| *G06F 3/0482* | (2013.01) |
| *G06F 3/0485* | (2013.01) |
| *G06F 17/24* | (2006.01) |

(52) U.S. Cl.
CPC .......... *G06F 3/0483* (2013.01); *G06F 3/0482* (2013.01); *G06F 3/0484* (2013.01); *G06F 3/0485* (2013.01); *G06F 3/04847* (2013.01); *G06F 9/453* (2018.02); *G06F 16/27* (2019.01); *G06F 17/24* (2013.01); *G06F 17/248* (2013.01)

(58) Field of Classification Search
CPC ............ G06F 3/0483; G06F 17/30575; G06F 3/0482; G06F 9/453; G06F 3/0484
USPC .................................................. 707/600–899
See application file for complete search history.

(56) References Cited

U.S. PATENT DOCUMENTS

| | | | |
|---|---|---|---|
| 5,114,291 A | 5/1992 | Hefty | |
| 6,859,211 B2 | 2/2005 | Friedlander | |
| 7,574,649 B1 * | 8/2009 | Safars | G06F 17/30899 715/200 |

(Continued)

*Primary Examiner* — Isaac M Woo
(74) *Attorney, Agent, or Firm* — Jason P. Webb; Pearson Butler

(57) ABSTRACT

A computerized system and method for creating interactive electronic books over a computerized network. The system includes an effects library module having a plurality of interactive effects wizard modules configured to automate code generation for an effect, the effects include performing a mathematical function on user input; animating a graphic on a trigger; playing an author uploaded audio file on a trigger; and scrolling a user view on a trigger other than a usual scroll trigger; triggering code generated by an interactive effects wizard module; delaying operation of code generated by an interactive effects wizard module; requesting a user input and storing the same in memory; operating a user interface effect; changing a display characteristic of a displayed object; selecting a displayed item; sending data on a trigger; controlling the display of media by a user; randomizing an effect, and etc.

12 Claims, 17 Drawing Sheets

(56) References Cited

U.S. PATENT DOCUMENTS

| | | |
|---|---|---|
| 7,631,013 B2 | 12/2009 | Parsons et al. |
| 8,424,916 B2 | 4/2013 | Shade |
| 2002/0124048 A1 | 9/2002 | Zhou |
| 2005/0202386 A1 | 9/2005 | Clements |
| 2012/0171653 A1 | 7/2012 | Kwon et al. |
| 2012/0236201 A1 | 9/2012 | Larsen et al. |
| 2012/0266058 A1 | 10/2012 | Miller, Jr. |
| 2012/0272159 A1 | 10/2012 | Seth et al. |
| 2013/0117665 A1 | 5/2013 | Tagliaferri et al. |
| 2013/0124980 A1 | 5/2013 | Hudson et al. |
| 2013/0132228 A1 | 5/2013 | Chang |

* cited by examiner

COMPUTERIZED SYSTEM FOR CREATING INTERACTIVE ELECTRONIC BOOKS

CROSS-REFERENCE TO RELATED APPLICATIONS

This application is a Continuation Application of, under 35 U.S.C. § 121, and claims priority to, under 35 U.S.C. § 121, U.S. Non-Provisional application Ser. No. 14/194,707, entitled COMPUTERIZED SYSTEM FOR CREATING INTERACTIVE ELECTRONIC BOOKS, by Antonio Gentile, filed on Mar. 1, 2014. This invention claims priority, under 35 U.S.C. § 120, to the U.S. Provisional Patent Application No. 61/861,912 to Antonio Gentile filed on Aug. 2, 2013, which is incorporated by reference herein.

BACKGROUND OF THE INVENTION

Field of the Invention

The present invention relates to electronic books, specifically to a computerized system and method for creating interactive electronic books.

Description of the Related Art

An electronic book or e-book is a publication in digital form, consisting of text, images, or both, readable on computers, tablets or other electronic devices. Although sometimes defined as "an electronic version of a printed book", many e-books exist without any printed equivalent. Commercially produced and sold e-books are usually intended to be read on dedicated e-book readers, however, almost any sophisticated electronic device that features a controllable viewing screen, including computers, many mobile phones, and all smart phones may also be used to read e-books.

While an e-book reader costs much more than one book, the electronic texts are at times cheaper. Moreover, a great share of e-books are available online for free, minus the minimal costs of the electronics required. For example, all fiction from before the year 1900 is in the public domain. Also, libraries lend more current e-book titles for limited times, free samples are available of many publications, and there are other lending models being piloted as well. E-books may be printed for less than the price of traditional new books using new on-demand book printers. An c-book can be purchased/borrowed, downloaded, and used immediately, whereas when one buys or borrows a book, one must go to a bookshop, a home library, or public library during limited hours, or wait for a delivery.

Some e-books are interactive and/or include programmed effects, such as but not limited to animations, spreadsheet-style functions, etc. However, creating such an e-book requires the author to either be a programmer or to hire a programmer. Accordingly, most e-book authors are limited to creating e-books without any special effects.

Some improvements have been made in the field. Examples of references related to the present invention are described below in their own words, and the supporting teachings of each reference are incorporated by reference herein:

U.S. Pat. No. 7,631,013, issued to Parsons et al., discloses a book or other digital content is represented as a set of objects in a relational database schema format called IBF (Interactive Book Format) and the controlling system software. This design provides for viewing books in a manner that coordinates additional information and provides interaction with the original book, while not disturbing the original publication and copyrighted material and even protecting that copyrighted material from piracy by supporting industry standard digital rights management security features. The inventive technique includes the use of conversion engines which will aid publishers in converting existing books into IBF format. The inventive technology further provides the ability to read any book in IBF format on a computer using refreshable Braille display, allowing the reader the advantage of reading all books in this format without having to purchase expensive, specially made Braille books.

U.S. Pat. No. 8,424,916, issued to Shade, discloses methods for creating customized children's storybooks with fingerprint art using fingerprint-ready image templates stored in association with a software application running on a standard home computer system. The systems and methods include the use of preconfigured templates and prompted discussions that elicit responses from the child to create the text for the storybook. Initially, the appropriate size of the child's fingerprint is determined and the storybook scenes are scaled to fit that size. Fingerprint-ready image templates are used to facilitate the creation of fingerprint art. An image template is formed by including within it at least one fingerprint-sized area. A completed image is formed by inserting a fingerprint into the fingerprint-sized area, and if desired, coloring the image or drawing a scene around the image. In one technique, an entire scene is produced including one or more fingerprint-ready image template(s). When the storybook scenes are completed the software application compiles the book pages and prints the same. The child then personalizes the scene images with their fingerprint and the storybook is bound for repeated reading.

U.S. Patent Application Publication No.: 2013/0117665, by Tagliaferri et al., discloses a system and method of individualized media publishing including a customization server configured to receive an electronic work from a content creator, create a custom field within the electronic work, and store the custom field in a database or a memory storage device. The system and method receives a request for a customized electronic work from a consumer, and transmits a notification to the content creator informing the content creator of the request for the customized electronic work. The system inserts customized content created by the content creator into the custom field and creates the customized electronic work. The customized electronic work may then be delivered to the consumer.

U.S. Patent Application Publication No.: 2012/0171653, by Kwon et al., discloses a method of creating a relationship diagram for electronic book (or e-book) contents in a reader includes determining whether there is a relationship diagram creation request in a current page. The method includes, if there is the relationship diagram creation request, determining whether there is a relationship diagram associated with a previous page. In addition, the method includes, if there is the relationship diagram associated with the previous page, displaying the relationship diagram in an input window. Further, the method includes, if the relationship diagram displayed in the input window is modified and there is a save request, allowing the modified relationship diagram to be saved in accordance with the current page.

U.S. Patent Application Publication No.: 2002/0124048, by Zhou, discloses a web based interactive multimedia story authoring system and method are provided including a user part, a computer server part, and a means of communication part. A user accesses a web site through the means of communication, the web site being hosted by the computer server. The user is able to create stories while being logged on to the web site, through selection of various story components as arranged and selected by the user. Story components may include text, background, character/objects, music/audio, or other files stored at the computer server, as well as files which may be uploaded to the computer server by the user. The web site provides various user executable commands to add, delete, or modify components of a story. The web based authoring system allows for publication of stories to a worldwide audience, and facilitates writing competitions to anyone having access to the worldwide web. User accounts may be established for frequent users allowing a user to save and publish stories. Because the system is web based, there is virtually a limitless amount of data to choose from in terms of components to make up a particular story.

U.S. Patent Application Publication No.: 2013/0124980, by Hudson et al., discloses A digital content creation platform can include a variety of features for creating an interactive digital publication. The functionality can include adding one or more sections, one or more pages to a section, and one or more layers to a page, such as box, story, image, video, table, map, and annotation layer types. Additionally, the digital content creation platform can include functionality to add multimedia content to a layer, link layers, and/or add some other action, such as an interactivity feature or behavior. The digital content creation platform can also include functionality to generate a template from the current layout or convert the current layout to a different template layout. At any point during the design, the digital content creation platform can be used to preview or run the digital publication. Finally, after adding content, the digital content creation platform can compile the digital publication for distribution.

The inventions heretofore known suffer from a number of disadvantages which include being limited in use, being difficult to use, being limited in application, being limited in animation, being limited in functionality, being limited in distribution, being limited in interactivity, not enabling an author to generate special effects within their e-book, being difficult to program, not including enough options, failing to connect developers with authors, failing to facilitate collaboration, failing to track authoring progress, being limited in distribution format, failing to register page items in relation to each other, etc.

What is needed is a computerized system and method for creating interactive electronic books that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available computerized systems and methods for creating interactive electronic books. Accordingly, the present invention has been developed to provide a system and method for creating interactive e-books over a network.

According to one embodiment of the invention, there is a computerized system for creating interactive electronic books over a network. The system may include an effects module that may have a plurality of interactive effects wizard modules that may automate code generation for customized interactive effects in electronic books. The effects library module may include a wizard management module that may facilitate uploading of interactive effects wizard modules into the effects library module and manages conditional user access to the same based on setting selected by authors of the associated interactive effects wizard module.

The interactive effects wizard modules may be configured to automate code generation for an effect selected from the group of effects that may consist of: performing a mathematical function on user input; animating graphic on a trigger; changing a background to a custom background on a trigger; changing text in a body of text to a user input text on a trigger; changing text in a body of text on a trigger; playing an author uploaded audio file on a trigger; and scrolling a user view on a trigger other than a usual scroll trigger; triggering code generated by an interactive effects wizard module; delaying operation of code generated by an interactive effects wizard module; requesting a user input and storing the same in memory; operating a user interface effect; changing a display characteristic of a displayed object; selecting a displayed item; sending data on a trigger; controlling the display of media by a user; and randomizing an effect.

The system may include a first database module that may have a relational database that may be stored in a memory device that stores information associated with electronic book generation that may include information related to selected interactive effects wizard modules. The relational database may track the relation of display objects such that the relational display of the same is selectably preserved during authoring of an electronic book.

The computerized system may include a second database module that may have a database that may not be a relational database. The database that is not a relational database may be a textual data format The system may include a database federation module that may have a processor functionally coupled between the first database and the second database such that changes to one of the first and second databases may be automatically updated in the other.

The computerized system may include a user interface module that may be functionally coupled to each of the effects library module and the first database module such that a user may selectably manipulate the same in creation of an electronic book. The user interface module may include a network module that may have a network communication device over a network. The relational database may store authoring progress information and wherein the user interface module may use such stored authoring progress information to return to an editing state on request from an author. The system may include a template management module that may include a library of templates effects selectable by an author for use in authoring an electronic book.

According to one embodiment of the invention, there is a method of creating interactive electronic books using a computerized system over a network. The method may include the step of automatically generating code for creating interactive effects in electronic books in response to author input using an effects library module including a plurality of interactive effects wizard modules. The method may include storing information associated with electronic book generation including information related to selected interactive effects wizard modules using a first database module including a relational database stored in a memory device and a second database module including a database that is not a relational database.

The method may include the step of automatically updating changes to one of the first and second databases when the other is updated using a database federation module including a processor functionally coupled between the first database and the second database. The method of creating interactive electronic books may include the step of selectably manipulating one of the first and second databases in creation of an electronic book in response to user commands received over a network module including a network communication device over a network.

The method may include the step of facilitating uploading of interactive effects wizard modules into the effects library module and managing conditional user access to the same based on setting selected by authors of the associated interactive effects wizard module. The method may include storing authoring progress information and returning an editing interface to an editing state on request from an author based on stored authoring progress information. The method of creating interactive electronic books may include the step of providing a template management module that includes a library of templates effects selectable by an author for use in authoring n electronic book. The method may also include the step of tracking the relation of display objects such that the relational display of the same is selectably preserved during authoring of an electronic book.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
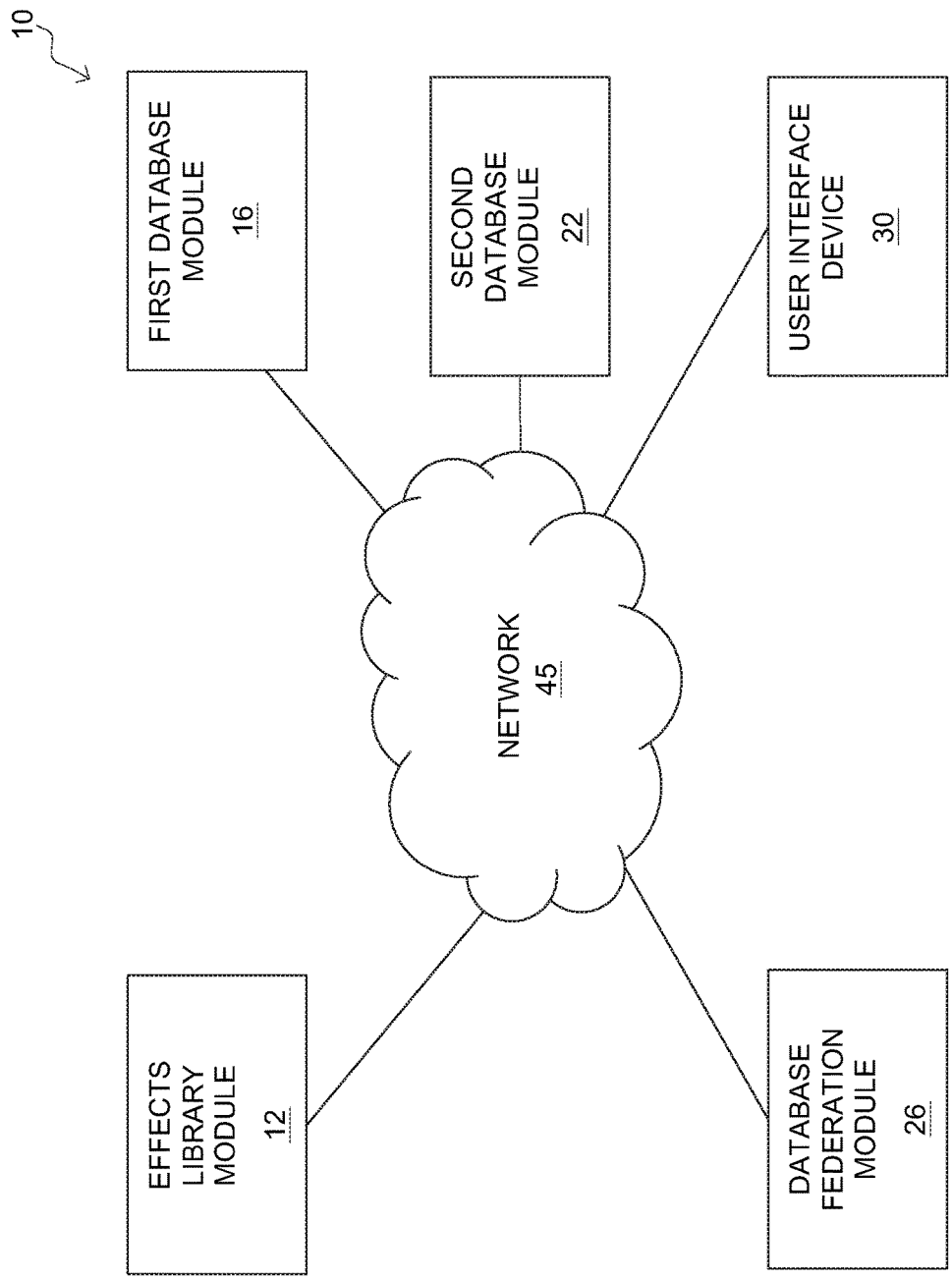
FIG. 1 is a network diagram of a computerized system tor creating interactive electronic books, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Andriod, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc, may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers, Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, hut do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment, Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a network diagram of a computerized system for creating interactive electronic books, according to one embodiment of the invention. There is shown a computerized system 10 for creating interactive electronic books over a network including an effects library module 12, a first database module 16, a second database module 22, a database federation module 26, and an user interface module 30 each in communication with each other over a computerized network 45.

The illustrated computerized system 10 for creating interactive electronic books over a network 45 includes an effects library module 12. The effects library module 12 is in communication with the modules and components of the computerized system 10. The effects library module 12 is configured to automate code generation for customized interactive effects in electronic books. Such may be accomplished wherein there is a library of functions, each function performing an interactive effect and the effects library module interfaces with the same such that selections made by an author when implementing the interactive effect into their eBook are stored as arguments of the function. In another non-limiting embodiment, such selections are entered into the function code itself using a search and replace tool and then the function code that has been so modified is appended into and functionally coupled to the stored code associated with the eBook being created.

The effects library 12 is also configured to facilitate uploading of interactive effects wizard modules (functions, wizards, etc.) into the effects library module and manages conditional user access to the same based on setting selected by authors of the associated interactive effects wizard module. Basically, from an author's point of view, they are presented with a great variety of effects modules from which to select that have been uploaded and prepared by developers. The author need not be able to code to select and use these tools and may customize them to the degree allowed by the developer through the interface tools of the effects library module. In doing so, the toots/effect is then automatically integrated into the eBook being authored by the author. Accordingly, authors may select from and use a wide variety of effects within their eBooks without needing to hire or even comprehend programming. This, advantageously, opens up the full functionality of eBooks to authors without substantially increasing the authoring costs.

The illustrated effects library module 12 is configured to automate code generation for various effects, such as but not limited to those selected from the group of effects consisting of: performing a mathematical function on user input; animating a graphic on a trigger; changing a background to a custom background on a trigger; changing text in a body of text to a user input text on a trigger; changing text in a body of text on a trigger; playing an author uploaded audio file on a trigger; and scrolling a user view on a trigger other than a usual scroll trigger; triggering code generated by an interactive effects wizard module; delaying operation of code generated by an interactive effects wizard module; requesting a user input and storing the same in memory; operating a user interface effect; changing a display characteristic of a displayed object; selecting a displayed item; sending data on a trigger; controlling the display of media by a user; and randomizing an effect. Accordingly, an author may have access to such effects and may integrate the same into an eBook by selecting the effect, selecting one or more characteristics/properties/targets/inputs/etc. and placing the effect in a desired location and/or connected to one or more media files, text bodies, pages, other effects or the like, such as but not limited to by drag-and-drop operation on the body of the representation of the effect in the authoring interface.

The illustrated computerized system 10 includes a first database module 16 in communication with the effects library module 12 over a network 45. The first database module 16 is configured to store information associated with electronic book generation including information related to selected interactive effects wizard modules. The first database 16 stores authoring progress information such as but not limited to a position of a cursor, a partial data selection set within a wizard, a list of open wizards/modules, an instruction set to a collaboration partner (e.g. developer, designer, author, etc.), and the like and combinations thereof. The first database module 16 is also configured to track the relation of display objects such that the relational display of the same is selectably preserved during authoring of an electronic book. Such advantageously allows for the system to generate eBooks wherein pagination is predefined and rules about such are enforced during the use/viewing of the eBook. Further, such relational information may be utilized by the system to associate editing functions/tools/devices with particular portions of the stored eBook as it is being created and thus allows the system to do editing/authoring functions such as but not limited to "remembering" where the author left off in the creation process during the most recent session, placing markers on unfinished portions/pages, leaving editor notes in association with specific display objects, assigning debugging tasks to developers, assigning design change tasks to designers of templates, and the like and combinations thereof. Thus the relational database provides for enhanced functionality, interactivity, cooperation/collaboration, and ease of use for those involved in the process (especially the author).

The illustrated computerized system 10 includes a second database module 22 in communication with the first database module 16 and the effects library module 12 over a computerized network 45. The second database module 22 is not a relational database and therefore is able to store information in a more free-flowing format, such as but not limited to being stored in an XML format, a textual data format and/or other non-SQL databases such as but not limited to the non-SQL databases commonly known as the Google databases. Advantageously, non-paginated eBooks may be easily published from such a format.

The illustrated system 10 includes a database federation module 26 in communication with the modules and components of the system 10 over a computerized network 45. The database federation module 26 is functionally coupled between the first database 16 and the second database 22 such that changes to one of the first and second databases are automatically updated in the other. Such a module may include one or more rules/scripts/protocols/etc. for converting, transmitting, storing, recording, replacing, cleaning, verifying, appending and otherwise updating data in one or more databases such as but not limited to that described in US Patent No. 20050251812 to Jerry Hayward, which is incorporated by reference herein for its supporting teachings.

Accordingly, while an author may be building a paginated eBook, a non-paginated version may be stored simultaneously and contemporaneously with the creation of the paginated version of the book. Such may be useful in various editing/debugging processes and/or in increasing the publication options available to the author once the eBook is finished.

The illustrated computerized system 10 includes a user interface module 30 in communication with the modules and components of the system 10 over a network 45. The user interface module 30 is functionally coupled to each of the effects library module 12 and the first database module 16 such that a user selectably manipulates the same in creation of an electronic book. The user interface module 30 uses stored authoring progress information to return to an editing state on request from an author or user. Such a user interface module may include a graphical user interface (GUI) and/or one or more interface devices (e.g. mouse, keyboard, display, etc.) as well as non-transitory computer-readable instructions for operation of the same and communication therethrough to one or more of the other modules described herein.

According to one embodiment of the invention, there is a method of creating interactive electronic books using a computerized system over a network. The method includes one or more of the following steps: automatically generating code for creating interactive effects in electronic books in response to author input using an effects library module including a plurality of interactive effects wizard modules; storing information associated with electronic book generation including information related to selected interactive effects wizard modules using a first database module including a relational database stored in a memory device and a second database module including a database that is not a relational database; automatically updating changes to one of the first and second databases when the other is updated using a database federation module including a processor functionally coupled between the first database and the second database; selectably manipulating one of the first and second databases in creation of an electronic book in response to user commands received over a network module including a network communication device over a network; facilitating uploading of interactive effects wizard modules into the effects library module; managing conditional user access to the same based on setting selected by authors of the associated interactive effects wizard module; storing authoring progress information; returning n editing interface to an editing state on request from an author based on stored authoring progress information; providing a template management module that includes a library of templates effects selectable by an author for use in authoring an electronic book; and/or tracking the relation of display objects such that the relational display of the same is selectably preserved during authoring of an electronic book.

According to one embodiment of the invention, there is an internet based tool that allows for authoring of an interactive e-book. The tool may be cloud-based, by employing a set of templates which encapsulate programming code which may include three parts, such as but not limited to: HTML, Javascript, and Cascading Style Sheets (CSS) and may be published using the ePub 3.0 standard or another standard as desired. ePub is a free and open eBook standard by the International Digital Publishing Forum (IDPF) whose files generally have the extension ".epub." The most recent, as of the time of preparing this application, specifications and changes to ePub may be found at http://www.idpf.org/epub/30/spec/epub30-changes.html.

Content may be interactive and may be provided by the user/author in collaboration with one or more collaborators, such as but not limited to developers, designers, editors, other authors, critics, readers and the like and combinations thereof. There may be standalone software (e.g. not cloud-based) that may create eBooks. The following are other examples for forms and formats to which the system may communicate, puclish, or otherwise be associated with: iBook Author by Apple, INKLING Platform, etc.

According to one embodiment of the invention, there is an internet based tool for processing the publishing of an e-book in a non-proprietary form. Such a tool may include one or more modules such that an author does not need to hire a programmer to do the interactive parts of the e-book, because wizards/templates are available that the author can simply make selections and define how the interactive effects are associated with the eBook and the system automatically generates the needed code for the effect(s) to function. Such a system may be used as a free-flow approach to building an e-book, instead of being limited to only a page by page approach, which the page approach mandates font size and placement of everything. Accordingly, such data may be stored in a non-relational database, even if other information, such as but not limited to authoring/editing information, is stored in a relational database that may be federated with the non-relational database. Such a system may include interactive features that automatically generate code needed to: generate animations, data entry and recovery, send data to a backend server, graphical user interface (like entering information into a radar plot, drag and drop, etc.), multiple choice question and answers, display media (video, scroll through and blow up photos, play audio, etc.), rotate objects (images, text boxes, video, etc.), and scripted/triggered effects (e.g. when touched, etc.). The system may include a developer module that allows/facilitates programming access to effects modules/wizards for programmers (developers or authors with programming knowledge/skill) so they may customize such modules beyond the simple selections allowed to authors. Such enables the system to generate even more effects. Outside parties may generate templates and wizards that may be accessible to the program and the system may facilitate the upload, dissemination, and publication of the same to authors using the system.

According to one embodiment of the invention, there is an internet tool that may generate an e-pub distribution that may be imported into a reading device through a browser, including but not limited to Safari. The tool may include an engine that may be a federated XML-SQL database. Such may perform as persistence layer to ensure that associated e-pub documents are maintained through the editing into their final format. Such a system may store data during editing/authoring in a non-transitory form, such as but not limited to being stored on a hard drive and may be continually and/or contemporaneously updated as work is done by the author and/or other collaborators.

According to one embodiment of the invention, there is a software-as-a-service system over a network that is designed to develop/author/produce e-Books thereby opening the scope of who can author richly featured eBooks. The system may allow writers to add engaging interaction and content to their storytelling, without a programmer's direct intermediation to their creativity. The system may include a collection of visual and interactive objects (which may be called e-Book templates) that may be used by creators to ease e-Book development and which may automatically, when selected, configured specific design, formatting, option and capability settings, such as but not limited to background color/graphic, page size, margins, font(s), colors, text size, kerning, special indicators, graphical interfaces, page settings, special pages, available wizards/effects modules, and the like and combinations thereof.

The system may be a web-based platform that may enable different categories of users to create, expand and publish highly interactive e-Books. Users' categories may be authors, publishers, graphics designers, and user experience/interaction designers. The system may include one or more modules that facilitate and/or enable designers to easily build and deploy/publish to the community/system eBook templates that may be design objects which authors may use on their own to add appealing look and interaction to create they own book. Authors may, through the system, manage an eBook through all the realization steps: creation of an eBook with interaction, check and verification of the realizations and publication on different stores.

The system may integrate facilities for selecting multi-language support, selecting desired level of translation services (provided by third party organizations, in partnership), providing billing and order tracking facilities, assembling translated material into localized copies of eBook, ensuring second level quality controls, delivering multiple eBooks, one per language selected. Such translation information may be stored in a relational database, relating such information to untranslated counterparts within the eBook.

The system may be a multiplatform enabled/compatible system and may allow multi-deployment of itself and/or in publications arising therefrom. The system may be cloud-based and therefore be accessible over a network. Users may be allowed, by the system, to adapt one of the available eBook templates to their purposes. The system may use a federation of different databases e.g. xml and relational ones such as but not limited to SQL) to store contents and information. The system may allow different types of users (free users, premium users) to perform different activities within the framework. The process of writing and creation of templates may be guided by the system.

The authors may create their eBooks in various ways, such as but not limited to: a) by starting from scratch: selecting eBook template, selecting layout for every page, adding text, images, audio and video file, adding interaction to content; and/or b) by uploading their own files (word, page, wordpad, and etc), importing contents in the selected eBook template and managing the formatting rules of the eBook in the platform adding interactions and controls.

The system may open to third-party designers and developers via API and/or may include one or more modules that: provide a WYSIWYG interface; perform grammatical and syntax checking; and/or a search engine of multimedia contents based on keywords (e.g. photos, images, graphics, sounds, songs, videos, links).

The system may integrate one or more modules that: provide multi-language support; facilitate ordering, purchasing, effectuating, and completing a desired level of translation services (which may be provided by third party modules that may be functionally coupled to the system); providing billing and order tracking facilities for one or more collaborating parties; assembling translated material into localized copies of eBook; ensuring second level quality controls; and/or producing multiple eBooks, e.g. one per language selected.

The system may be designed as software as a service (SaaS) in which software and associated data are centrally hosted on the cloud, SaaS may be typically accessed by users via a web browser (e.g. Internet Explorer, Safari, and so on), allowing for Multiplatform Use, e.g., users may use with any operating system, either a Mac OS or a Windows.

An eBook produced with the system may be in standard format such as but not limited to ePub, which allows for multiplatform deployment/consumption. Accordingly, users/readers may deploy the eBook on any device that has an ePub Reader. These readers may be freely and immediately available for any mobile Oss (e.g. iOS, Android, etc.).

According to one embodiment of the invention, there is a system that may provide one or more of the following modules: a network of technical skills to enable creators to tell their stories, by third party API by designers & developers as add-on; a search engine of multimedia contents based on keywords (e.g. photos, images, grapichs, sounds, songs, videos, links); an e-commerce platform; a proprietary publishing platform; a dictionary for the platform language (e.g. if the platform is in English then the dictionary is in English); grammatical and syntax checking; customization; re-use of existing contents; deployment on existing platforms; print on demand; and the platform may be implemented in English and in Italian, and later in other popular languages such as but not limited to French, Spanish, German, and Arabic, etc.

According to one embodiment of the invention, there is a system that includes one or more modules that: allows users to create their own eBook through the Authoring Platform, to sell and/or buy books, to be updated about digital publishing from feeds/mining from/of blogs and/or forums. One or more services may be available through a web site able to perform multiplatform accesses. In this way there may be no/few limitations regarding the operating systems and/or devices (desktop computers, tablets). The Authoring platform may allow users to create eBooks in a simple and intuitive way using one or more of the following tools (and/or other tools described herein): modules to manage multimedia and textual contents, modules to manage graphical contents and modules to manage interactive objects According to one embodiment of the invention, there is an authoring platform that may be organized as Software as a Service (SaaS) meaning software and associated data are distributed over the cloud. Users log in to the Server through the client accessible within a web browser (Internet Explorer, Safari, Chrome, Firefox). The system may provide users one or more of the functionalities to create an eBook: Contents, Design, Interaction, Deploy, Demo Mode and Customer Care.

The system may include a template and graphic section. The system shows all the available templates; the user selects a template, which is associated to the book. The Contents section is arranged according to the chosen template. The system allows the author to choose the Contents section and adds or chooses a chapter to add a new page. The system shows the possible layouts. The author adds a page by selecting layout. The layout selection defines what types of contents have to pre provided by the author to create the page.

The system may allow an author in the Interaction section to choose a page of the chapter containing the image to incorporate the rotation interaction (through an animation wizard/effects module). The effects module may show one or more possible interactions compatible with the selected contents. The author may selects the interaction with a set of parameters such as but not limited to selectable triggers and effects such as but not limited to: start of the interaction "on touch" with a "very slow" velocity with "45°" degrees rotation in "clockwise" direction. Interaction properties are applied to the image.

The final and desired output of the processes described herein will generally be an eBook in ePub3.0 format (or another standard format). In this way a multiplatform distribution is ensured because ePub3 is a standard that may be reproduced in any device equipped with an eBook reader. Many readers may be available for different OS systems and for different devices. According to the device a suitable reader will be advised to the user to obtain the best user experience The system includes a content section that allows users to insert multimedia content within the eBook and has the following capabilities: insert/Modify book metadata (title, subtitle, authors, ISBN, series, conference); import of the whole content from another source (word, pdf file); insert/modify/eliminate chapters; insert/modify/eliminate chapters titles; drag and drop chapter to modify the order in the book.

The system includes a graphic section proposes a set of possible graphic solutions per the eBook defines as "templates"; each of the possible templates has different layouts for the first page, the summary of the book and the other components of the book.

The system may include two different families of templates: fixed layout templates and free flow templates. The former fix some of the eBook aspects (page dimension, font type and dimension, position of the graphical and multimedia objects in the pages). Using a fixed layout is possible to build ad-hoc effects and to organize enhanced rendering for the pages. The free flow layout is more suited for novel and typical books that don't need any particular organization of the pages. Templates are categorized for type of users (free, full) and type of publication (novel, scientific paper). These templates have some peculiar features able to characterize the eBook. Three non-limiting possible layouts may be provided for different components of the eBook: first page layout; index layout; and page layout.

Figure 2:
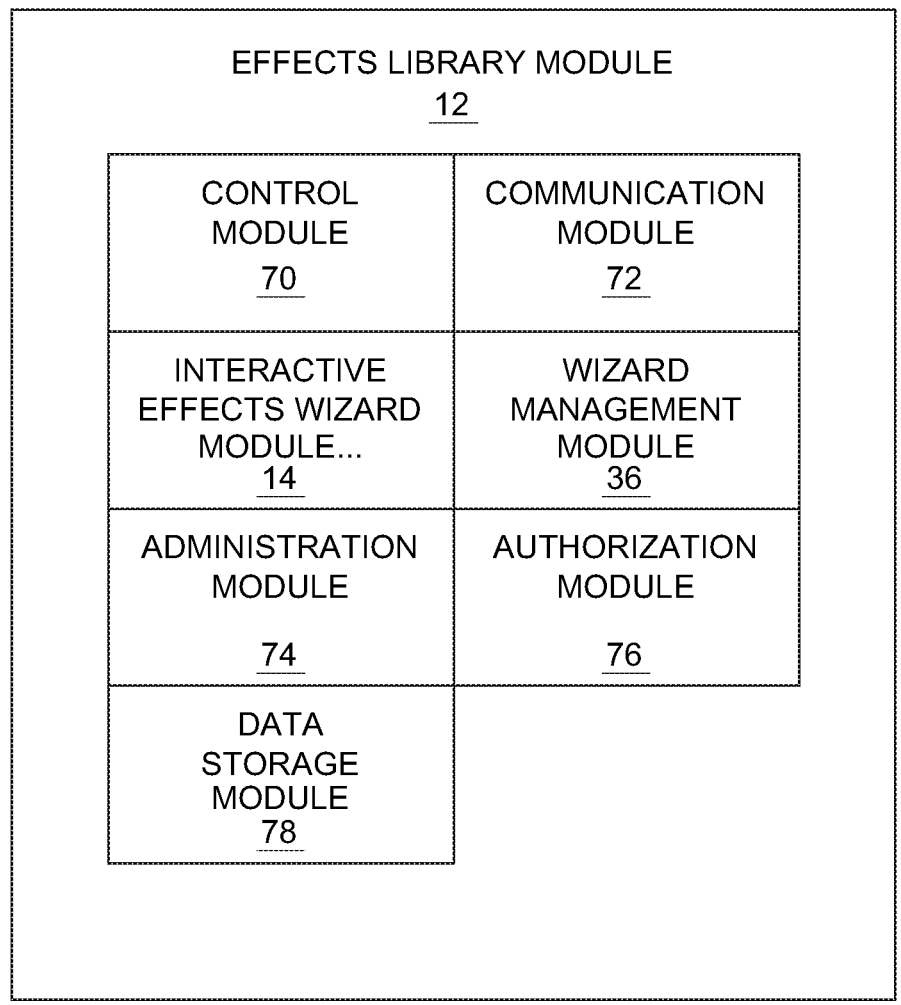
FIG. 2 is a module diagram of an effects library module of a computerized system for creating interactive electronic books, according to one embodiment of the invention.

FIG. 2 is a module diagram of an effects library module of a computerized system for creating interactive electronic books, according to one embodiment of the invention. There is shown an effects library module 12 including a control module 70, a communication 72, a plurality of interactive effects wizard modules 14, a wizard management module 36, an administration module 76, an authorization module 78, and a data storage module 78. Such are in communication, one with another, as needed to perform their various functions.

The illustrated effects library module 12 is configured to automate code generation for customized interactive effects in electronic books and to include a plurality of author selectable modules which perform the same and provide selectable controls over such effects, allowing authors to customize the parameters of the same (e.g. timing, target data, user input(s), acceptable data formats, media files to be acted upon, linked effects, etc.). The effects library module 12 is also configured to facilitate uploading of interactive effects wizard modules into the effects library module 12 so that developers can incorporate new wizard modules into the system. The library module 12 may also track the use of such uploaded modules and associate the same with payments, credits, fame, popularity, etc. tracking by the system of particular developers and/or their incorporated creations. The effects library module 12 is configured to manage conditional user access to the interactive effects wizard module based on setting selected by authors of the associated interactive effects wizard module. Such may be conditional on one or more characteristics/parameters, including but not limited to payment by an author, author name, boot title, genre of book being authored, author membership, author status, author popularity, author distribution measurements, etc.

The illustrated effects library module 12 includes a control module 70 functionally coupled to the modules and components of the effects library module 12. The control module 70 is configured to manage operational controls, standards, parameters, or settings of the effects library module 12. Non-limiting examples of a control module may be a control module described in U.S. Pat. No. 5,430,836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

The illustrated effects library module 12 includes a communication module 72 in communication with the modules and components of the effects library module 12. The communication module 72 is configured to provide communication capabilities to the modules and components of the effects library module 12. Such communication may be wireless, especially in regards to communications over a network, and/or may be wired and/or over a bus, such as may generally be found within a portable communication device. The communication module may also be configured to provide a secure method of communication over a network. Non-limiting examples of a communication module may be but not limited to: a communication module described in U.S. Pat. No. 5,307,463, issued to Hyatt et al.; or a communication module described in U.S. Pat. No. 6,133,886, issued to Fariello et al. which are incorporated for their supporting herein.

The illustrated effects library module 12 includes a plurality of interactive effects wizard modules 14 configured to automate code generation for customized interactive effects in electronic books. The interactive effects wizard modules 14 are configured to automate code generation for an effect which may include, but is not limited to, one or more effects selected from the group of effects consisting of: performing a mathematical function on user input; animating a graphic on a trigger; changing a background to a custom background on a trigger; changing text in a body of text to a user input text on a trigger; changing text in a body of text on a trigger; playing an author uploaded audio file on a trigger; and scrolling a user view on a trigger other than a usual scroll trigger; triggering code generated by an interactive effects wizard module; delaying operation of code generated by an interactive effects wizard module; requesting a user input and storing the same in memory; operating a user interface effect; changing a display characteristic of a displayed object; selecting a displayed item; sending data on a trigger; controlling the display of media by a user; and randomizing an effect.

The illustrated effects library 12 includes a wizard management module 36 configured to facilitate uploading of interactive effects wizard modules 14 into the effects library module 12. The wizard management module 36 is configured to manage conditional user access to the interactive effects wizard modules 14 based on setting selected by authors of the associated interactive effects wizard modules 14. The wizard management module 36 is configured to provide managerial capabilities to a user of the effects library module 12 and to the interactive effects wizard modules 14. Non-limiting examples of a wizard management module may be a management system as described in U.S. Patent No Publication No.: 2010/0042503 by Farmer; or a management module as described in U.S. Patent Publication No.: 2011/0251888 by Faith et al., which are incorporated for their supporting teachings herein.

The illustrated effects library module 12 includes an administration module 74 configured to provide administrative controls to an administrator of the effects library module 12. The administration module 74 is configured to set and edit parameters and settings for each of the modules and components of the effects library module 12. The administration module 74 is configured to generate and regulate the use of each author or user profile or account of the effects library module 12 over a computerized network. Non-limiting examples of an administration module may be an administration module as described in U.S. Patent Publication No.: 2011/0125900, by Janssen et al.; or an administration module as described in U.S. Patent Publication No.: 2008/0091790, by Beck, which are incorporated for their supporting teachings herein.

The illustrated effects library module 12 includes an authorization module 76 configured to authorize and authenticate access to the modules and components of the effects library module 12. The authorization module 76 is configured to verify data from a user, an author, or a viewer of the effects library module 12 before allowing access and linking capabilities to the users, authors, or viewers of the effects library module 12. Non-limiting examples of an authorization module may be an authorization module as described in U.S. Pat. No. 7,853,993, issued to Vayman; or an authorization module as described in U.S. Pat. No. 7,753,265, issued to Harris, which are incorporated for their supporting teachings herein.

The illustrated effects library module 12 includes a data storage module 78 in communication with the various modules and components of the effects library module 12 and configured to store data transferred therethrough. The data storage module 78 is configured to securely store user, author, and viewer account or profile data along with authentication and authorization codes to access the effects library module 12. The data storage module 78 is configured to store data from the effects library module 12, including data from the users of the system, data from authors of templates, data from third party viewers of the system, and data from the administrators of the system. Data storage modules may be databases or data files, and the memory storage device may be hard drives or tapes. A non-limiting example of a data base is Filemaker Pro 11, manufactured by Filemaker Inc., 5261 Patrick Henry Dr., Santa Clara, Calif., 95054. Non-limiting examples of a storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

Figure 3:
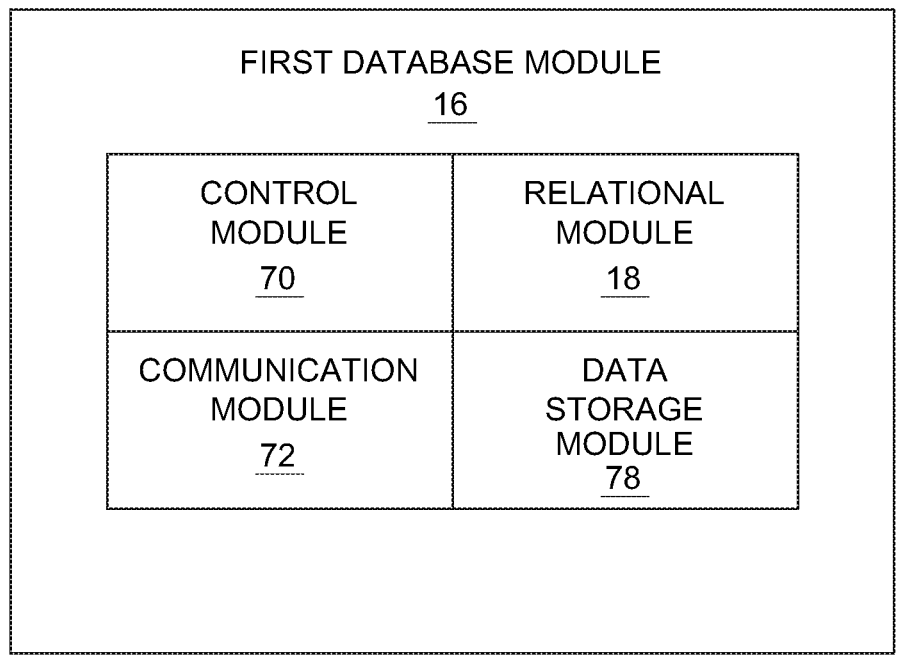
FIG. 3 is a module diagram of a first database module of a computerized system for creating interactive electronic books, according to one embodiment of the invention.

FIG. 3 is a module diagram of a first database module of a computerized system for creating interactive electronic books, according to one embodiment of the invention. There is shown a first database module 16 includes a control module 70, a relational database 18, a communication module 72, and a data storage module 78. Such are in communication, one with another, as needed to perform their various functions.

The illustrated first database module 16 is configured to store information associated with electronic book generation including information related to selected interactive effects wizard modules. The first database module 16 is also configured to track the relation of display objects such that the relational display of the same is selectably preserved during authoring of an electronic book.

The illustrated first database module 16 includes a control module 70 functionally coupled to the modules and components of the first database module 16. The control module 70 is configured to manage operational controls, standards, parameters, or settings of the first database module 16.

The illustrated first database module 16 includes a relational module 18 stored in a memory device, such as but not limited to a MySQL database, an open source database, by Oracle Corporation of Redwood Shores, Calif. and the F1 system by Google Inc, of Mountain View Calif. The relational module 18 stores information associated with electronic book generation including information related to selected interactive effects wizards. Such may be accomplished using a table-style database using tuples and attributes to define relations.

The illustrated first database module 16 includes a communication module 72 in communication with the modules and components of the first database module 16. The communication module 72 is configured to provide communication capabilities to the modules and components of the first database module 16. Such communication may be wireless, especially in regards to communications over a network, and/or may be wired and/or over a bus, such as may generally be found within a portable communication device. The communication module is also configured to provide a secure method of communication over a computerized network.

The illustrated first database module 16 includes a data storage module 78 in communication with the various modules and components of the first database module 16 and configured to store data transferred therethrough. The data storage module 78 is configured to securely store user, author, and viewer account or profile data along with authentication and authorization codes to access the first database module 16. The data storage module 78 is configured to store data from the first database module 16, including data from the users of the system, data from authors of templates, data from third party viewers of the system, and data from the administrators of the system.

Figure 4:
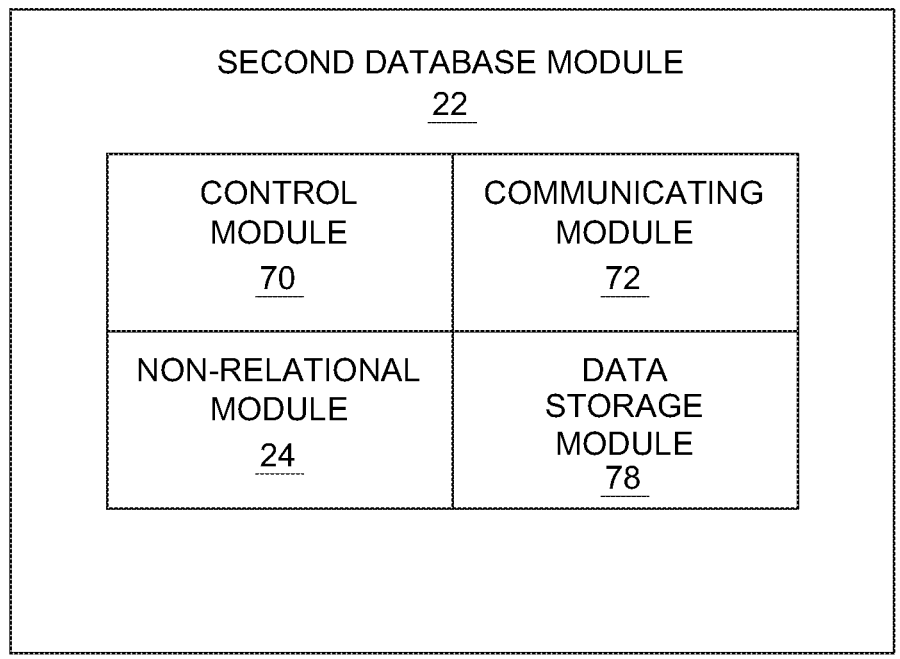
FIG. 4 is a module diagram of a second database module of a computerized system for creating interactive electronic books, according to one embodiment of the invention.

FIG. 4 is a module diagram of a second database module of a computerized system for creating interactive electronic books, according to one embodiment of the invention. There is shown a second database module 22 including a control module 70, a communication module 72, a non-relational database 24, and a data storage module 78. Such are in communication, one with another, as needed to perform their various functions.

The illustrated second database module 22 is in communication with modules and components of the computerized system over a computerized network. The second database module 22 is configured to not be a relational database, such as but not limited to an XML database engine, such as but not limited to BaseX by BaseX GmbH of Konstanz, Germany. The second database 22 that is not a relational database may be merely a database that stores data in a textual data format, such as but not limited to the Universal Text Data format (UTD) proposed by Jukka K. Korpela at http://www.cs.tut.fi/~jkorpela/data/utd.html.

The illustrated second database module 22 includes a control module 70 functionally coupled to the modules and components of the second database module 22. The control module 70 is configured to manage operational controls, standards, parameters, or settings of the second database module 22.

The illustrated second database module 22 includes a communication module 72 in communication with the modules and components of the second database module 22. The communication module 72 is configured to provide communication capabilities to the modules and components of the second database module 22. Such communication may be wireless, especially in regards to communications over a network, and/or may be wired and/or over a bus, such as may generally be found within a portable communication device. The communication module is also configured to provide a secure method of communication over a computerized network.

The illustrated second database module 22 includes a data storage module 78 in communication with the various modules and components of the second database module 22 and is configured to store data transferred therethrough. The data storage module 78 is configured to securely store user, author, and viewer account or profile data along with authentication and authorization codes to access the second database module 22. The data storage module 78 is configured to store data from the second database module 22, including data from the users of the system, data from authors of templates, data from third party viewers of the system, and data from the administrators of the system.

Figure 5:
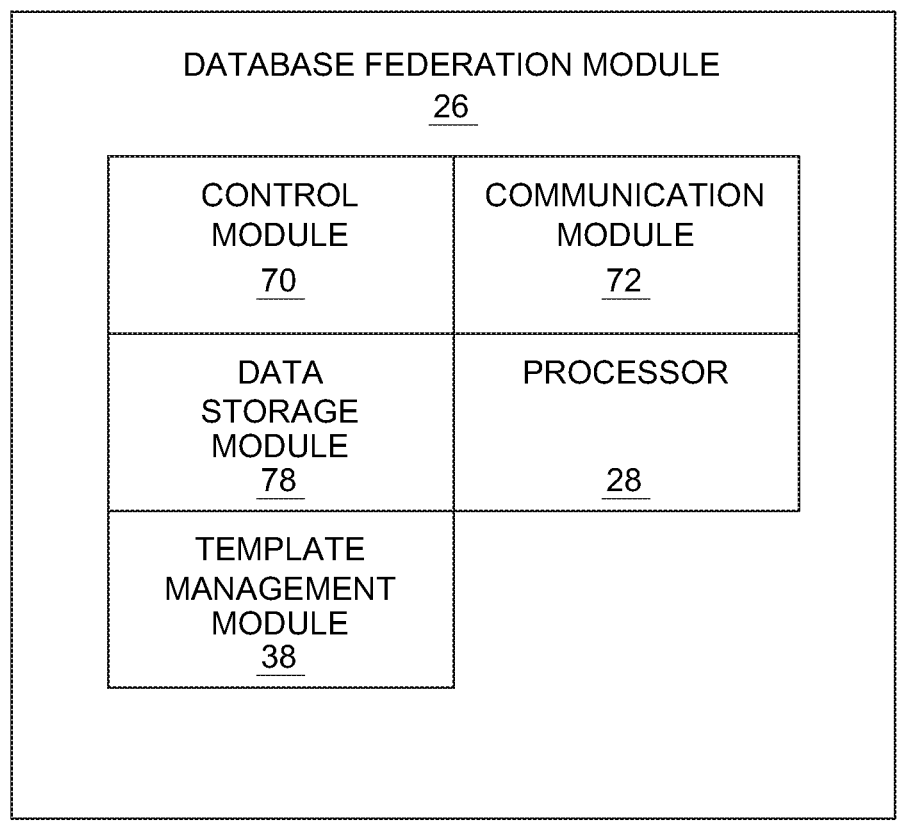
FIG. 5 is a module diagram of a database federation module of a computerized system for creating interactive electronic books, according to one embodiment of the invention.

FIG. 5 is a module diagram of a database federation module of a computerized system for creating interactive electronic books, according to one embodiment of the invention. There is shown a database federation module 26 including a control module 70, a communication module 72, a data storage module 78, a processor 28, and a template management module 38. Such are in communication, one with another, as needed to perform their various functions.

The illustrated database federation module 26 is in communication with the modules and components of the system 10 over a computerized network 45. The database federation module 26 is functionally coupled between the first database and the second database such that changes to one of the first and second databases is automatically updated in the other. Such databases may be remote from each other or may exist within a single server, even stored on the same data storage device.

The illustrated database federation module 26 includes a control module 70 functionally coupled to the modules and components of the database federation module 26. The control module 70 is configured to manage operational controls, standards, parameters, or settings of the database federation module 26.

The illustrated database federation module 26 includes a communication module 72 in communication with the modules and components of the database federation module 26. The communication module 72 is configured to provide communication capabilities to the modules and components of the database federation module 26. Such communication may be wireless, especially in regards to communications over a network, and/or may be wired and/or over a bus, such as may generally be found within a portable communication device. The communication module is also configured to provide a secure method of communication over a computerized network.

The illustrated database federation module 26 includes a data storage module 78 in communication with the various modules and components of the database federation module 26 and configured to store data transferred therethrough. The data storage module 78 is configured to securely store user, author, and viewer account or profile data along with authentication and authorization codes to access the database federation module 26. The data storage module 78 is configured to store data from the database federation module 26, including data from the users of the system, data from authors of templates, data from third party viewers of the system, and data from the administrators of the system.

The illustrated database federation module 26 includes a processor 28 functionally coupled between the first database and the second database such that changes to one of the first and second databases is automatically updated in the other. The processor 28 is configured to compute data received from the first database module and the second database module through a computerized network. Non-limiting examples of a processor may be a processor module as described in U.S. Pat. No. 6,516,373, issued to Talbot et al.; or a processor module as described in U.S. Patent Publication No.: 2006/0155955, by Gschwind et al., which are incorporated for their supporting teachings herein.

The illustrated database federation module 26 includes a template management module 38 in communication with the modules and components of the system 10 over a computerized network. The template management module 38 includes a library of templates effects selectable by an author for use in authoring an electronic book. Non-limiting examples of a template management module may be a management system as described in U.S. Patent No Publication No.: 2010/0042503 by Farmer; or a management module as described in U.S. Patent Publication No.: 2011/0251888 by Faith et al., which are incorporated for their supporting teachings herein.

Figure 6:
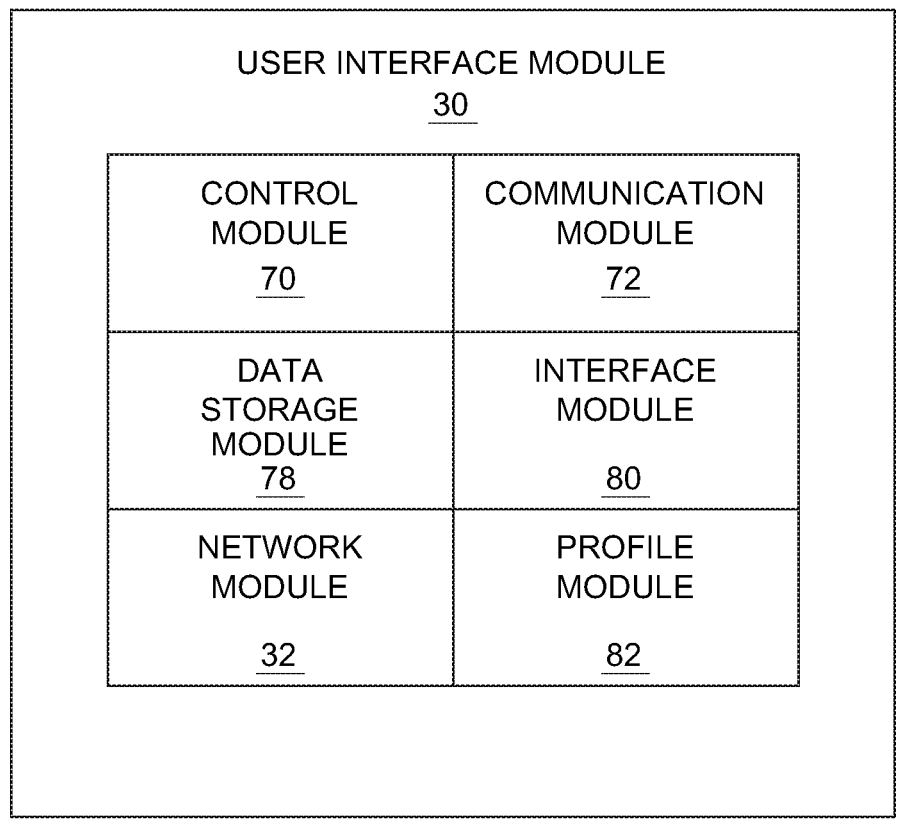
FIG. 6 is a module diagram of a user interface module of a computerized system for creating interactive electronic books, according to one embodiment of the invention.

FIG. 6 is a module diagram of a user interface module of a computerized system for creating interactive electronic books, according to one embodiment of the invention. There is shown a user interface module 30 including a control module 70, a communication module 72, a data storage module 78, an interface module 80, a network module 32, and a profile module 82. Such are in communication, one with another, as needed to perform their various functions.

The illustrated user interface module 30 is in communication with the modules and components of the computerized system over a computerized network. The user interface module 30 is functionally coupled to each of the effects library module and the first database module such that a user selectably manipulates the same in creation of an electronic book. The first database stores authoring progress information and wherein the user interface module 30 uses such stored authoring progress information to return to an editing state on request from an author or user.

The illustrated user interface module 30 includes a control module 70 functionally coupled to the modules and components of the user interface module 30. The control module 70 is configured to manage operational controls, standards, parameters, or settings of the user interface module 30.

The illustrated user interface module 30 includes a communication module 72 in communication with the modules and components of the user interface module 30. The communication module 72 is configured to provide communication capabilities to the modules and components of the user interface module 30. Such communication may be wireless, especially in regards to communications over a network, and/or may be wired and/or over a bus, such as may generally be found within a portable communication device. The communication module is also configured to provide a secure method of communication over a computerized network.

The illustrated user interface module 30 includes a data storage module 78 in communication with the various modules and components of the user interface module 30 and configured to store data transferred therethrough. The data storage module 78 is configured to securely store user, author, and viewer account or profile data along with authentication and authorization codes to access the user interface module 30. The data storage module 78 is configured to store data from the user interface module 30, including data from the users of the system, data from authors of templates, data from third party viewers of the system, and data from the administrators of the system.

The illustrated user interface module 30 includes an interface module 80 or an adaptive graphical user interface module, G.U.I. module is configured to provide individual user interface capabilities with the modules and components of the computerized system over a computerized network. The interface module 80 is configured to provide one or more interfaces for accessing the computerized system over a computerized network. Such may include one or more graphical user interfaces that may be embodied in software instructions for controlling display on a display (such as but not limited to a TV, monitor, cell phone/tablet screen, etc.) and/or for routing signals from an input device (such as but not limited to a keyboard, touchscreen, mouse, etc.) such that a user may perform data entries or queries in the computerized system, issue suggestions or recommendations, and receive data information therefrom. Such may be embodied in one or more user interfaces that permit browsing of the computerized system. Such may be embodied in one or more user interfaces that permit service personnel or administrators to make adjustments, changes, and otherwise provide personal profile or account updates to the computerized system. Such may be embodied in one or more user interfaces that permit review of data from the system, such as but not limited to template data, interactive effects data, profile data, management data, database usage, etc. Non-limiting examples of an interface module may be a HTML player, client server application, Java script application. A non-limiting example of an interface module is FlowPlayer 3.1, manufactured by FlowPlayer LTD, Hannuntie 8 D), ESPOO 02360, Helsinki, Finland. Non-limiting examples of a display/interface module may be a display/interface module as described in U.S. Pat. No. 6,272,562, issued to Scott et al.; a touch screen interface module as described in U.S. Pat. No. 5,884,202 and U.S. Pat. No. 6,094,609, issued to Arjomand, which are incorporated for their supporting teachings herein.

The illustrated user interface module 30 includes a network module 32 having a network communication device configured to be in communication with a computerized network. The network module may be configured to mimic, generate, reproduce and/or be in communication with a network, such as, but not limited to those known as: the first database module, the second database module, the database federation module, etc. The network module may be configured to link a user or author's templates or books to a network and/or to other users/visitors of the computerized system.

The illustrated user interface module 30 includes a profile module 82 in communication with the control module 70 and the communication module 72 and configured to manage and store personal user or author settings, preferences, and parameters for use with the system. The profile module 82 is configured to store user template and database preferences and interests, based upon user input and also previous user history. Non-limiting examples of a profile module may be a user account including demographic information about a user as well as preference information about a user that is associated therewith. Such information may include preferred usage, objectives, and the like and combinations thereof. Such may be embodied in a database or other data structure/hierarchy such that the data associated with each ay be used by one or more modules described herein and/or may be altered and/or added to by one or more modules described herein.

Figure 7:
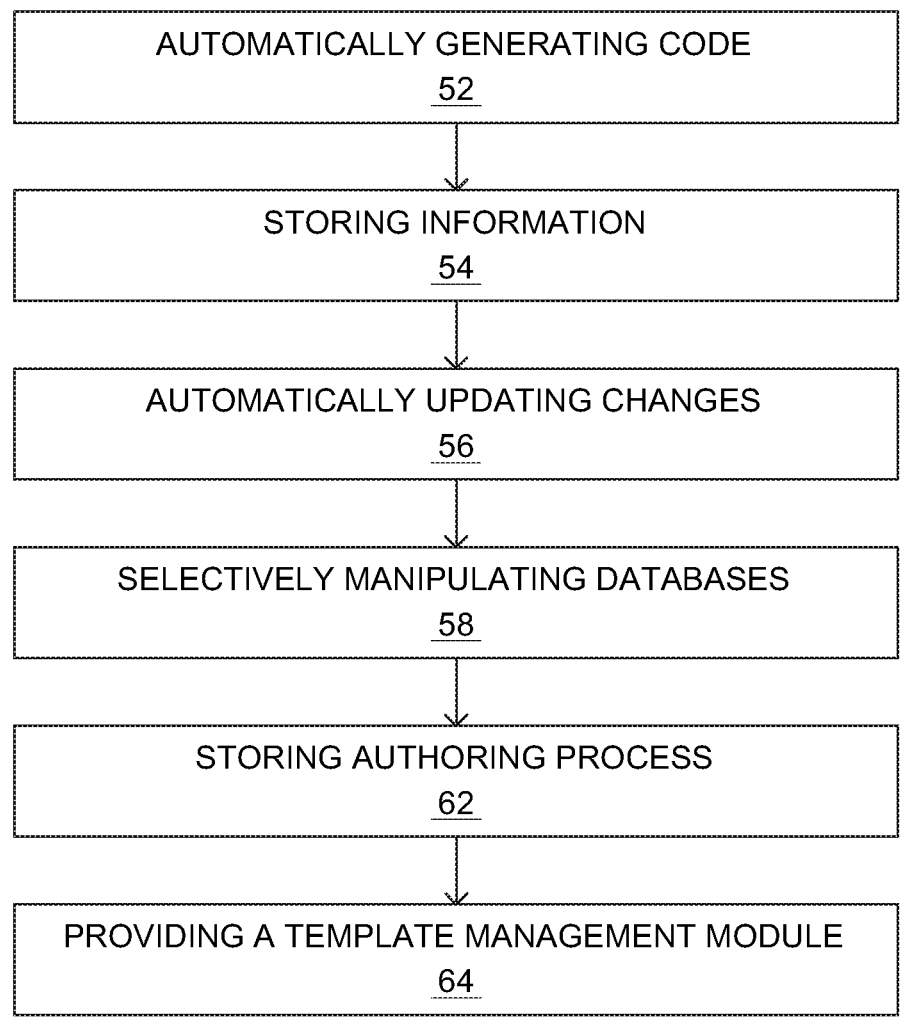
FIG. 7 is a flow chart of a method of creating interactive electronic books over a computerized network, according to one embodiment of the invention.

FIG. 7 is a flow chart of a method of creating interactive electronic books over a computerized network, according to one embodiment of the invention, There is shown a method of creating interactive electronic books over a computerized network 50. While the illustration displays an order to the described steps, it is understood that such steps may be performed in a different order and that some steps may be performed multiple times during the course of creating an electronic book.

The illustrated method of creating interactive electronic books 50 includes the step of providing a template management module that includes a library of templates and/or effects selectable by an author for use in authoring an electronic book 51. Accordingly, an author may select from one or more templates and/or effects so provided to use in generating an eBook. Generally, such will occur at least at an initial phase of creating an eBook. However, even template election may occur at a different time, later in the process, as such templates may be coded such that existing content may be integrated therein automatically.

The illustrated method of creating interactive electronic books 50 includes the step of automatically generating code for creating interactive effects in electronic books in response to author input using an effects library module including a plurality of interactive effects wizard modules 52. Accordingly, an author need not be able to program to be able to create programmed effects. The system itself generates the desired effects based on selections made by the author during the use of such modules.

The illustrated method 50 includes the step of storing information associated with electronic book generation including information related to selected interactive effects wizard modules using a first database module including a relational database stored in a memory device and a second database module including a database that is not a relational database 54. Thus such information is stored in a manner that permits relational storage of information as well as freeform storage. This increases the ease of publishing to multiple formats, speeds editing, facilitates the creation process, etc.

The illustrated method of creating interactive electronic books 50 includes the step of automatically updating changes to one of the first and second databases when the other is updated using a database federation module including a processor functionally coupled between the first database and the second database 56. Such may occur by fixing a database as a master storage database and automatically propagating changes to the same to the other database. Generally some data translation, cleaning, etc. will need to occur during that process since each database stores data in a different manner. Since the two databases are generally updated continually, the benefits experienced by having both forms of data storage are instantly available at virtually all times.

The method of creating interactive electronic books 50 includes the step of selectably manipulating one of the first and second databases in creation of an electronic book in response to user commands received over a network module including a network communication device over a network 58. Such may occur as storing authored content on one or more of the databases. Such may occur as automatically adjusting relational information associated with an eBook in response to a change in template used therewith. Such may occur as editing a table, such as but not limited to adding a new relation, attribute or tuple, such as but not limited to in response to an author/publisher selecting that a work be translated to another language, thus requiring that all relations be copied and then modified during the translation process.

The method 50 includes the step of facilitating uploading of interactive effects wizard modules into the effects library module and managing conditional user access to the same based on setting selected by authors of the associated interactive effects wizard module. Such may include providing an upload utility with a module manager that may be associated with an account management module that allows uploaders to upload files in association with an account and to set attributes of the same, which may determine accessibility and publishing options for such uploaded wizards. Accordingly, developers may independently create and upload effects wizards for use by authors and may, through the system, transact business in regards to use of the same. A similar structure may be in place for designers to upload templates, graphic art, backgrounds, audio files, etc.

The illustrated method of creating interactive electronic books 50 includes the step of storing authoring progress information and returning an editing interface to an editing state on request from an author based on stored authoring progress information 62. Such may be accomplished by storing relational information about authoring/editing of a particular eBook, such as but not limited to open windows, recent selections, undo history, cursor position, editing notes, communications with developer/design accounts, recent purchases, common selections made in wizards, common wizards used, common effects targets, and the like and combinations thereof.

The method 50 also includes the step of tracking the relation of display objects such that the relational display of the same is selectably preserved during authoring of an electronic book. Such may be accomplished by storing information in regards to display objects within a relational database.

Advantageously, the method described herein allows for authoring of very feature rich eBooks heretofore only accessible to authors who are programmers or who are willing to spend great sums in programming the same. Further, the authoring, editing, publishing, translating, etc. processes involved in creation of an eBook are simplified and centralized for the benefit of all parties involved.

Figure 8:
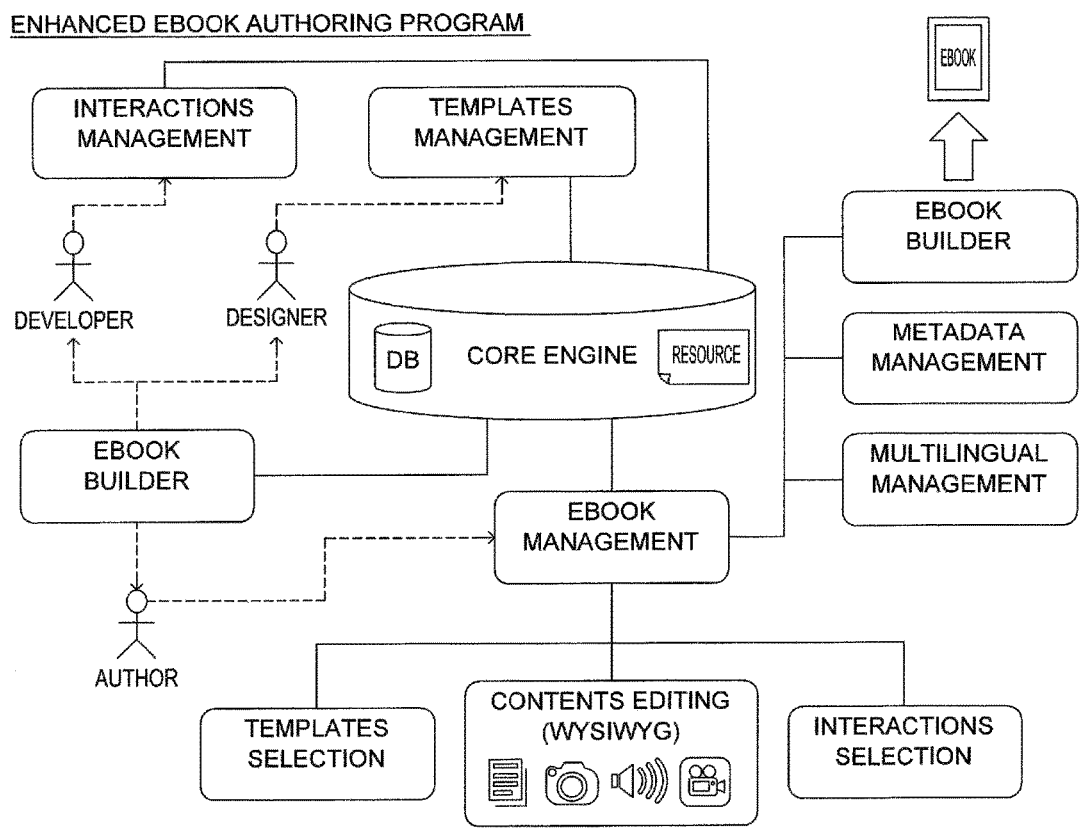
FIG. 8 is a system diagram of a computerized system for creating interactive electronic books showing interfacing amongst authors, developers and designers, according to one embodiment of the invention.

FIG. 8 is a system diagram of a computerized system for creating interactive electronic books showing interfacing amongst authors, developers and designers, according to one embodiment of the invention. There is shown an author, a developer, and a designer, each in communication with portions of a networked system configured to facilitate collaborative development of eBooks.

In particular, the author is interactively in communication with an eBook builder module and an eBook management module, configured, respectively to build eBooks and to manage the same through post creation processes such as but not limited to translation and publication. Through such modules, the author is able to be serviced by the core engine and other modules which support the functions desired by the author, including interactivity with developers and designers, either directly through communication between user accounts, or indirectly by selecting content/wizards developed by the same.

The developer and designer are in communication, respectively, with the interactions management module and the templates management module, which, provide management tools needed by the developer and designer in order to build and make available effects wizards and templates (and other media content) for use by the author. Through the same, the developer and designer are able to be served by the core engine and other modules in order to allow them to realize their contribution to eBook development.

Figure 9:
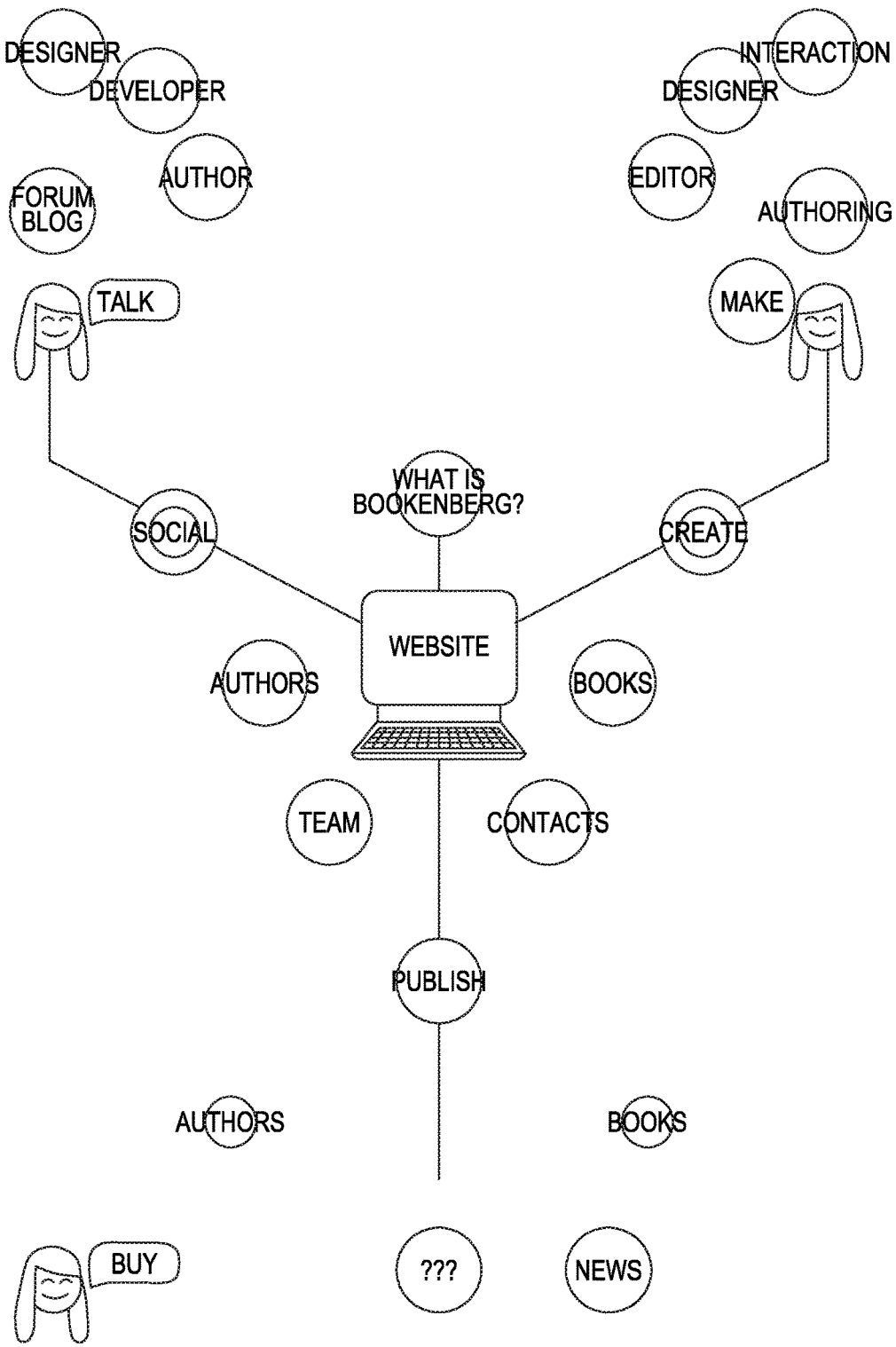
FIG. 9 is a conceptual diagram illustrating functions of a computerized system for creating interactive electronic books, according to one embodiment of the invention, according to one embodiment of the invention.

FIG. 9 is a conceptual diagram illustrating functions of a computerized system for creating interactive electronic books, according to one embodiment of the invention. In particular, such a system may include a website that may bring together, through various interfaces, authors, editors, publishers, readers, developers, designers, critics, commentators, and the like to a single central eBook system wherein eBooks may be developed, published, consumed, compared, revised, serialized and the like with all interested parties being involved through user interfaces including but not limited to editing modules, developer modules, user account management modules, blogs, discussion forums, website user portals, eBook viewers, programming suites, media development tools (e.g. image editing modules, sound editing modules, template development modules, etc.), and the like and combinations thereof. The illustration may be seen as a "big picture" guide for various pages of a website servicing such a variety of interested parties.

Figure 10:
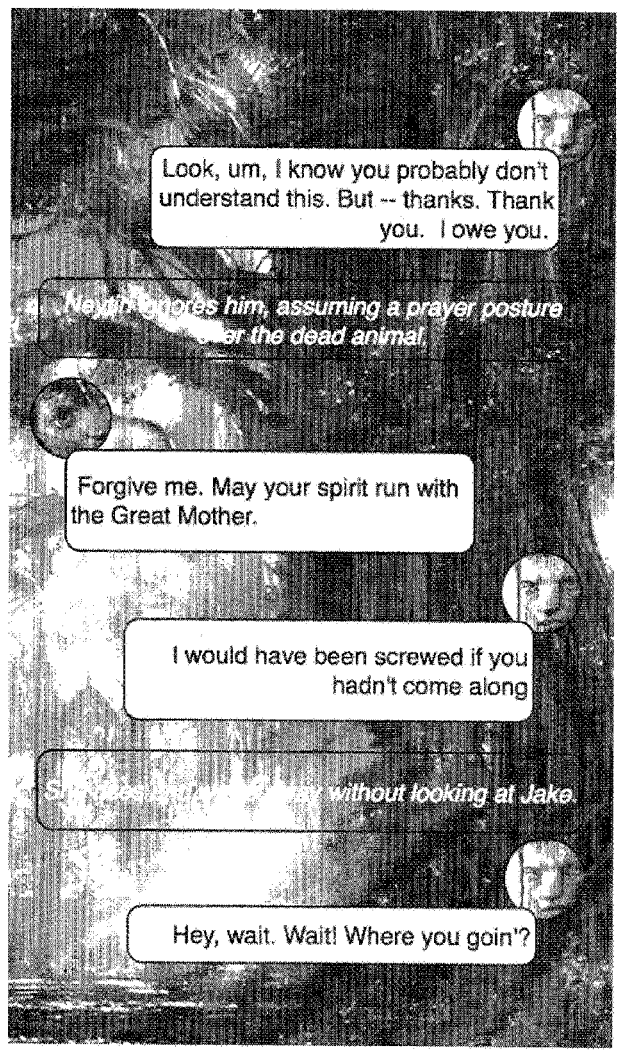
FIG. 10 is a prophetic example of an electronic book template in operation, according to one embodiment of the invention.
Figure 11:
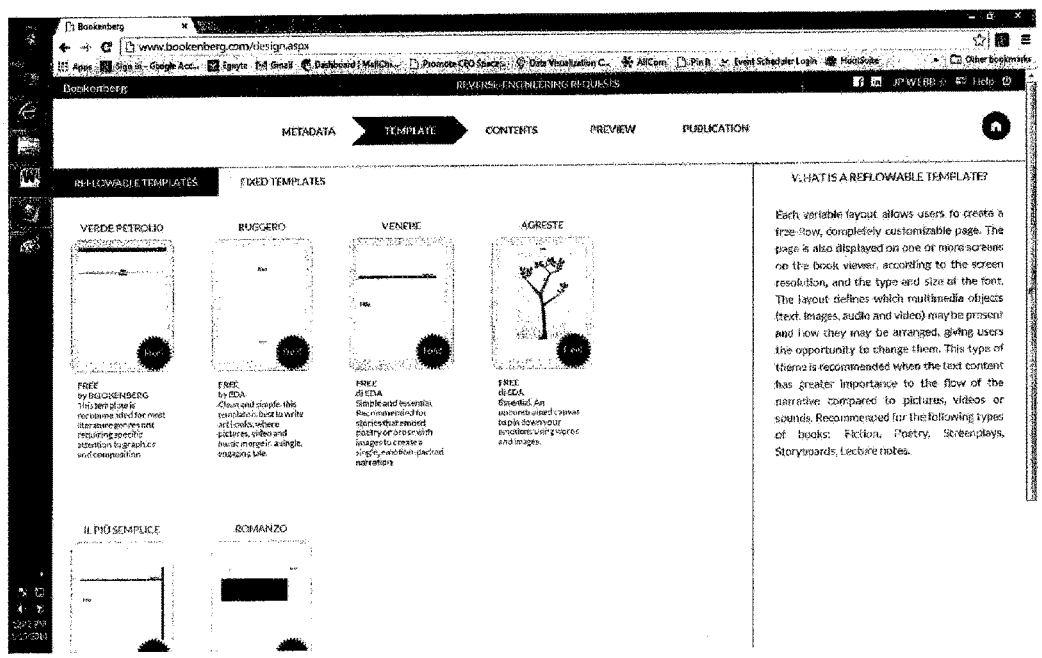
FIGS. 11-16 are screenshots of a computerized system and method of creating interactive electronic books, according to one embodiment of the invention.
Figure 12:
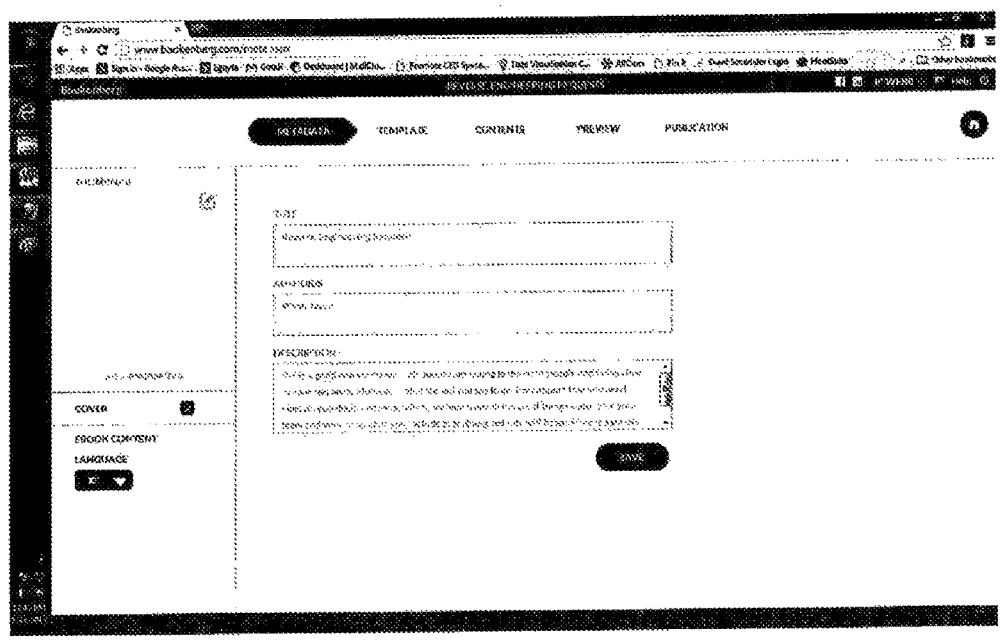
Figure 13:
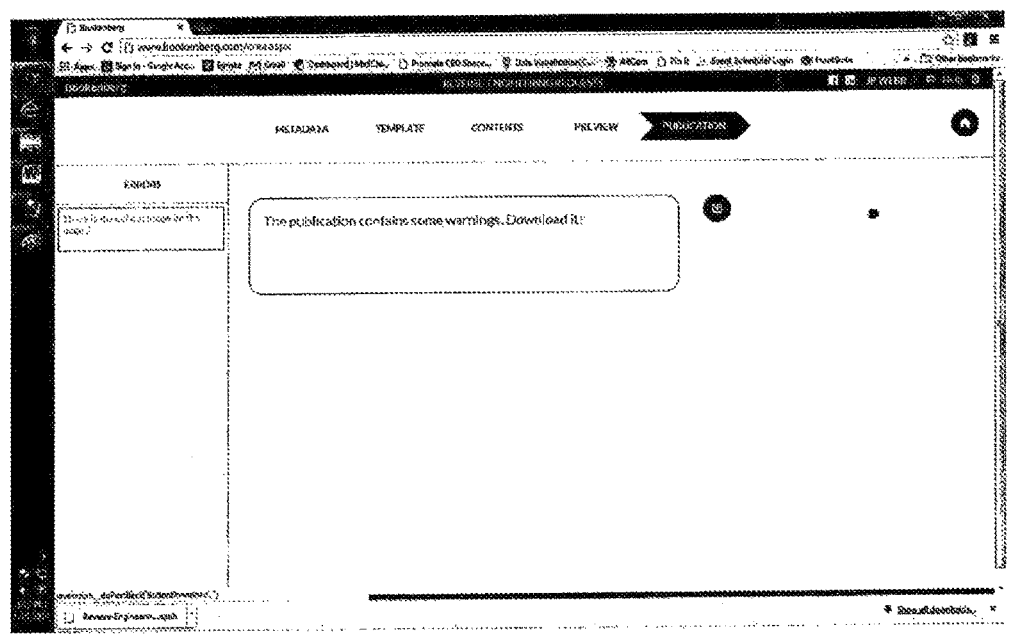
Figure 14:
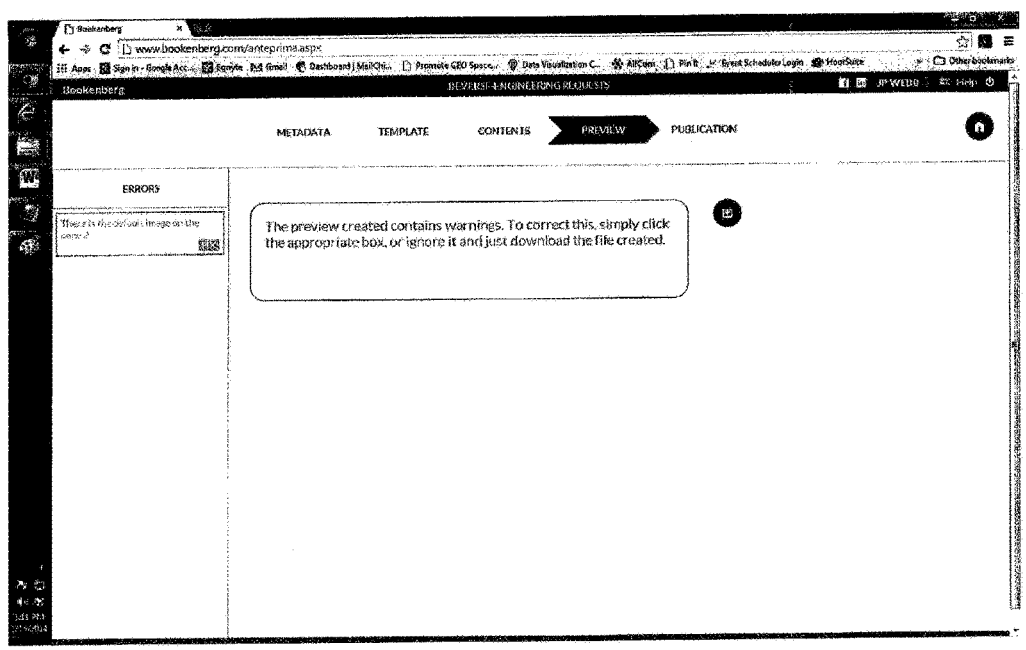
Figure 15:
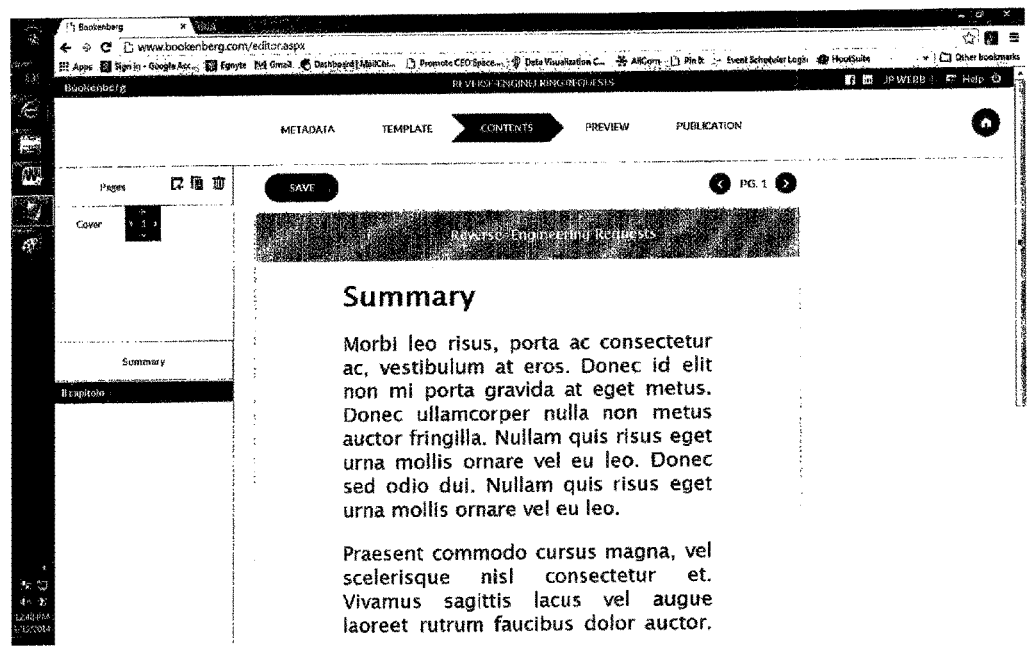
Figure 16:
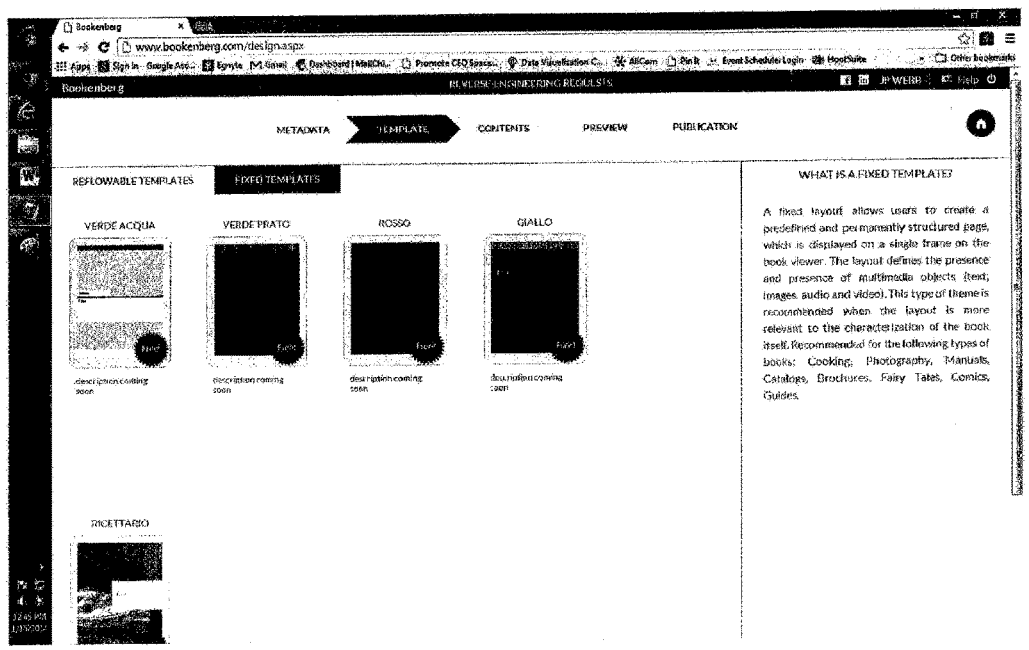

FIG. 10 is a prophetic example of an electronic book template in operation, according to one embodiment of the invention. In particular, the illustrated template is an example of how a template may be more than merely page layout, font selections and graphical decorations, but may include programmed effects and may fundamentally change how content is displayed.

In particular, the illustrated template in operation displays dialogue content between various voices in a story as if they are text messages between the parties/characters. Such dialogue is automatically associated with a particular character by placement of the dialogue box and adjacent association with a graphical representation of the character. Non-dialogue content (e.g. narration, etc.) is displayed inset into the conversation (e.g. "Neytiri ignores him, assuming a prayer posture over the dead animal.") and not associated with a particular character. In such a template, the authoring interface may closely resemble writing a screenplay, with portions of text associated with or stored in relation to characters and in relation to prior and subsequent lines as well as indicating who is speaking and associating one or more graphical representations with characters, scenes, settings, emotions, events, and the like and combinations thereof. Such a template may be compatible with other templates that use similar relational schema such as but not limited to templates for writing screenplays, musicals, conversational style teaching eBooks, and the like and combinations thereof.

In the illustrated example (themed after the 2009 movie Avatar written and directed by James Cameron), Jake (on the right side of the page) is in dialogue with Neytiri (on the left side of the page). There is a background to the dialogue representing the scene or setting. The template may include an effect wherein once a user has scrolled or otherwise moved through the dialogue to a particular point, the background image may animate, shift, be replaced, or otherwise change in automatic response to the readers position within the dialogue. Other effects, such as but not limited to text cloud background color changes, animated faux typing of text messages (e.g. the reader experiences the texting as if they are watching one or more of the characters actually typing in their messages, which may include a visual effect of typing a message but not sending it or editing before sending.

FIGS. 11-16 are screenshots of a computerized system and method of creating interactive electronic books, according to one embodiment of the invention. The screenshots illustrate a graphical user interface wherein an author selects a template from a plurality of templates and then progresses through user interface screens that permit authoring and publication of the same.

Figure 17:
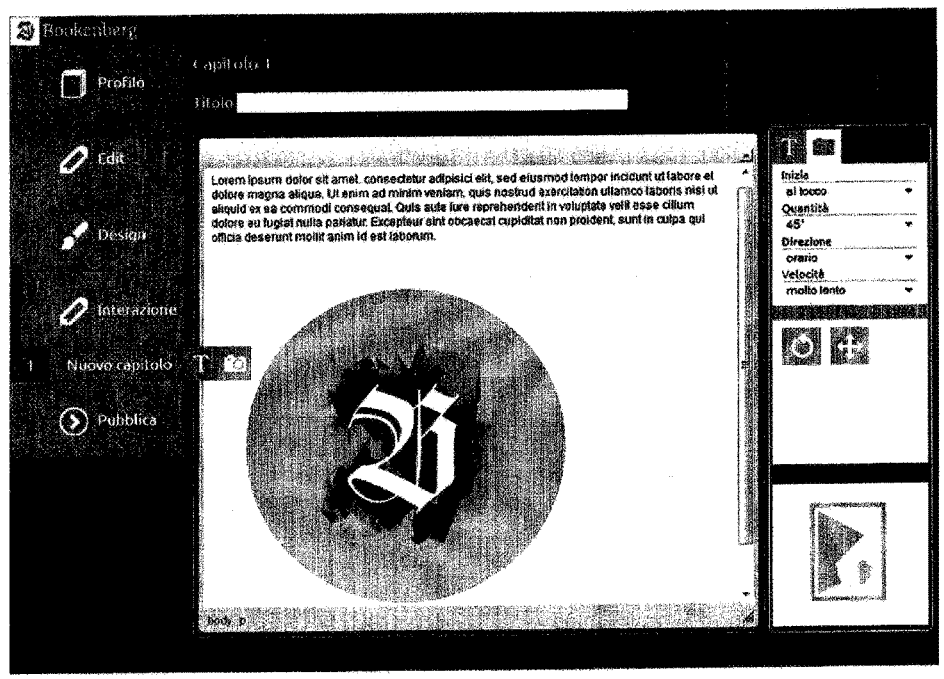
FIG. 17 is a screenshot of a user interface for an interactive effects wizard module.

FIG. 17 is a screenshot of a user interface for an interactive effects wizard module. The user interface is in the Italian language. In the illustrated interface there is a set of selectable customization parameters for an animated effect of causing a graphical image to rotate. In particular, the user may select from a drop down menu with regard to how the effect initiates ("Inizia") and the currently selected parameter is that the effect initiates "on touch" ("al tocco"), which would be when clicked on by the user. Another illustrated parameter selectably changeable through the interface is the amount of rotation ("Quantita") and the selected parameter is 45 degrees. Still another illustrated parameter selectably changeable through the interface is the direction of the rotation ("Direzione") and the selected parameter is clockwise ("orario"). Still yet another illustrated parameter selectably changeable through the interface is the rotational velocity ("Velocita") and the selected parameter is very slow ("motto lento").

Once the parameters are selected, the interactive effects wizard module automatically generates the software code needed to cause the effect to occur and integrates it into the database(s) of the system so that when published, the e-book will automatically include the desired customized effect without requiring the author to write code for the effect. Accordingly, authors with no experience in coding may be able to more fully utilize the multifaceted abilities of e-books instead of being stuck with simply laying text across a page.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent, to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A computerized system for creating interactive electronic books over a network, comprising:
   a) an effects library module including a plurality of interactive effects wizard modules that automate code generation for customized interactive effects in electronic books;
   b) a first database module including a relational database stored in a memory device that stores information associated with electronic book generation including information related to selected interactive effects wizard modules;
   c) a second database module including a database that is not a relational database;
   d) a database federation module including a processor functionally coupled between the first database and the second database such that changes to one of the first and second databases are automatically updated in the other; and
   e) a user interface module functionally coupled to each of the effects library module and the first database module such that a user may selectably manipulate the same in creation of an electronic book and including a network module including a network communication device over a network, wherein one of the interactive effects wizard modules automates code generation for an effect selected from the group of effects consisting of: performing a mathematical function on user input; animating a graphic on a trigger; changing a background to a custom background on a trigger; changing text in a body of text to a user input text on a trigger; changing text in a body of text on a trigger; playing an author uploaded audio file on a trigger; and scrolling a user view on a trigger other than a usual scroll trigger; triggering code generated by an interactive effects wizard module; delaying operation of code generated by an interactive effects wizard module; requesting a user input and storing the same in memory; operating a user interface effect; changing a display characteristic of a displayed object; selecting a displayed item; sending data on a trigger; controlling the display of media by a user; and randomizing an effect.

2. The system of claim 1, wherein the effects library module further comprises a wizard management module that facilitates uploading of interactive effects wizard modules into the effects library module and manages conditional user access to the same based on setting selected by authors of the associated interactive effects wizard module.

3. The system of claim 1, wherein the relational database stores authoring progress information and wherein the user interface module uses such stored authoring progress information to return to an editing state on request from an author.

4. The system of claim 1, wherein the database that is not a relational database is a textual data format.

5. The system of claim 1, further comprising a template management module that includes a library of templates effects selectable by an author for use in authoring an electronic book.

6. The system of claim 1, wherein the relational database tracks the relation of display objects such that the relational display of the same is selectably preserved during authoring of an electronic book.

7. A computerized system for creating interactive electronic books over a network, comprising:

a) an effects library module including a plurality of interactive effects wizard modules that automate code generation for interactive effects in electronic books;
b) a first database module including a relational database stored in a memory device that stores information associated with electronic book generation including information related to selected interactive effects wizard modules; and
c) a user interface module functionally coupled to each of the effects library module and the first database module such that a user may selectably manipulate the same in creation of an electronic hook and including a network module including a network communication device over a network, wherein one of the interactive effects wizard modules automates code generation for an effect selected from the group of effects consisting of: performing a mathematical function on user input; rating a graphic on a trigger; changing a background to a custom background on a trigger; changing text in a body of text to a user input text on a trigger; changing text in a body of text on a trigger; playing an author uploaded audio file on a trigger; and scrolling a user view on a trigger other than a usual scroll trigger; triggering code generated by an interactive effects wizard module: delaying operation of code generated by an interactive effects wizard module; requesting a user input and storing the same in memory; operating a user interface effect; changing a display characteristic of a displayed object; selecting a displayed item; sending data on a trigger; controlling the display of media by a user; and randomizing an effect.

8. The system of claim 7, wherein the effects library module further comprises a wizard management module that facilitates uploading of interactive effects wizard modules into the effects library module and manages conditional user access to the same based on setting selected by authors of the associated interactive effects wizard module.

9. The system of claim 8, wherein in the relational database stores authoring progress information and wherein the user interface module uses such stored authoring progress information to return to an editing state on request from an author.

10. The system of claim 9, further comprising a template management module that includes a library of templates effects selectable by an author for use in authoring an electronic book.

11. The system of claim 10, wherein the relational database tracks the relation of display objects such that the relational display of the same is selectably preserved during authoring of an electronic book.

12. The system of claim 11, further comprising:
c) a second database module including a database that is not a relational database;
d) a database federation module including a processor functionally coupled between the first database and the second database such that changes to one of the first and second databases are automatically updated in the other.

* * * * *